US006959585B2

United States Patent
Brosnihan et al.

(10) Patent No.: US 6,959,585 B2
(45) Date of Patent: Nov. 1, 2005

(54) SKIDS, MODULES, AND MODULAR SYSTEM FOR MONITORING HYDROGEN-COOLED GENERATORS

(75) Inventors: Ronald F. Brosnihan, Troy, NY (US); Thomas J. Chenaille, Troy, NY (US); James T. Clark, Clifton Park, NY (US); Steven D. Kilmartin, Johnstown, NY (US); Steven E. Kodesch, Schenectady, NY (US); Robert A. Williams, Troy, NY (US)

(73) Assignee: Environment One Corporation, Niskayuna, NY (US)

( * ) Notice: Subject to any disclaimer, the term of this patent is extended or adjusted under 35 U.S.C. 154(b) by 561 days.

(21) Appl. No.: 09/993,390

(22) Filed: Nov. 14, 2001

(65) Prior Publication Data

US 2003/0090164 A1 May 15, 2003

(51) Int. Cl.$^7$ .............................................. G01N 25/00
(52) U.S. Cl. ....................... 73/25.01; 73/31.03; 310/56; 108/50.02; 108/50.18
(58) Field of Search .............................. 73/31.03, 29.01, 73/25.01, 865.8; 324/703, 772; 310/53, 55, 56; 108/42.48, 50.01, 50.02, 50.11, 50.18, 51.11, 901, 53.1, 53.3, 53.5, 56.1, 56.3, 57.2–57.34, 55.1, 55.5

(56) References Cited

U.S. PATENT DOCUMENTS

| | | | | |
|---|---|---|---|---|
| 1,778,834 A | * | 10/1930 | Penney ......................... 310/55 |
| 2,307,754 A | * | 1/1943 | Beckwith ...................... 310/55 |
| 2,307,755 A | * | 1/1943 | Beckwith ...................... 310/55 |
| 2,988,656 A | * | 6/1961 | Grobel ......................... 310/53 |
| 3,122,668 A | * | 2/1964 | Cuny ........................... 310/53 |
| 3,427,880 A | * | 2/1969 | Grobel et al. .................. 436/7 |
| 3,506,138 A | * | 4/1970 | Travis ......................... 108/91 |
| 3,822,389 A | * | 7/1974 | Kudlacik ...................... 310/53 |
| 3,894,138 A | * | 7/1975 | Klaar .......................... 310/53 |
| 3,916,671 A | * | 11/1975 | Carson et al. ............. 73/23.42 |
| 3,972,225 A | * | 8/1976 | Fort et al. .................. 73/28.04 |
| 4,008,755 A | * | 2/1977 | Vandamme ................ 165/11.1 |
| 4,046,512 A | * | 9/1977 | Kaczmarek et al. .......... 23/253 |
| 4,101,277 A | * | 7/1978 | Hickam .......................... 436/2 |
| 4,139,057 A | * | 2/1979 | Klaar .................... 165/104.13 |
| 4,300,066 A | * | 11/1981 | Butler, III ..................... 310/53 |
| 4,440,017 A | * | 4/1984 | Barton et al. ............. 73/40.5 R |

(Continued)

OTHER PUBLICATIONS

Brochure by Environment One Corporation, " Generator Condition Monitor for Air–Cooled Apparatus (GCM–A)", 4 pages, 1998.

Brochure by Environment One Corporation, "Generator Gas Analyzer (GGA)", 6 pages, 1998.

Brochure by Environment One Corporation, "Generator Condition Monitor–Explosion–Proof Design(GCM–X)", 4 pages, 1998.

*Primary Examiner*—Frank M. Lawrence
(74) *Attorney, Agent, or Firm*—Heslin, Rothenberg Farley & Mesiti P.C.

(57) ABSTRACT

A modular system for monitoring a hydrogen-cooled generator includes a skid having a platform and an upwardly extending support. The support is attachable to a hydrogen gas purity monitoring module, a generator overheat monitoring module, a hydrogen gas dryer module, a gas/generator monitoring module, and a gas manifold. The gas/generator monitoring module allows monitoring the operation of the hydrogen-cooled generator and generating data regarding the performance of the hydrogen-cooled generator. The gas/generator monitoring module may display an optimization factor or data regarding the performance of the hydrogen-cooled generator, and/or may be connected via a communications link to a remote control center.

25 Claims, 5 Drawing Sheets

U.S. PATENT DOCUMENTS

| | | | | |
|---|---|---|---|---|
| 4,531,070 A | * | 7/1985 | Kuhn | 310/56 |
| 4,698,756 A | * | 10/1987 | Gonzalez et al. | 702/130 |
| 4,766,557 A | * | 8/1988 | Twerdochlib | 702/51 |
| 4,870,393 A | | 9/1989 | Snuttjer et al. | 340/611 |
| 4,945,343 A | | 7/1990 | Rodriguez | 340/606 |
| 4,959,569 A | * | 9/1990 | Snuttjer et al. | 310/53 |
| 5,097,669 A | * | 3/1992 | Hargrove et al. | 62/96 |
| 5,123,277 A | | 6/1992 | Gray et al. | 73/29.01 |
| 5,581,470 A | | 12/1996 | Pawloski | 364/483 |
| 5,676,065 A | * | 10/1997 | Locker | 108/55.1 |
| 5,701,044 A | * | 12/1997 | Emshoff et al. | 310/54 |
| 5,979,338 A | * | 11/1999 | Salmanson et al. | 108/55.1 |
| 6,058,852 A | * | 5/2000 | Estvanko | 108/55.3 |
| 6,076,568 A | * | 6/2000 | Rehm et al. | 141/98 |
| 6,086,333 A | * | 7/2000 | Krutzfeldt et al. | 417/54 |
| 6,126,726 A | * | 10/2000 | Foley et al. | 96/11 |
| 6,324,858 B1 | * | 12/2001 | Holden | 62/211 |
| 6,326,709 B1 | * | 12/2001 | Adelmann et al. | 310/52 |
| 6,338,283 B1 | | 1/2002 | Blazquez Navarro et al. | 73/865.8 |
| 6,424,062 B1 | * | 7/2002 | Adelmann et al. | 310/53 |
| 6,456,095 B1 | | 9/2002 | Sorita et al. | 324/703 |
| 2003/0090164 A1 | * | 5/2003 | Brosnihan et al. | 310/55 |

\* cited by examiner

SKIDS, MODULES, AND MODULAR SYSTEM FOR MONITORING HYDROGEN-COOLED GENERATORS

FIELD OF THE INVENTION

The present invention relates generally to hydrogen-cooled generators, and more particularly to equipment for use in monitoring hydrogen-cooled generators.

BACKGROUND OF THE INVENTION

Hydrogen-cooled generators are often used by power utilities for generating electricity. Typically, separate, independent, stand-alone systems are employed in monitoring the operation of hydrogen-cooled generators to reduce the downtime of the hydrogen-cooled generators. For example, such systems for monitoring the operation of hydrogen-cooled generators include systems for monitoring hydrogen purity and systems for monitoring overheating of the generator. Other stand-alone systems include systems for removing contaminants from the hydrogen cooling gas. Typically, each of the standalone systems is separately operably connected to the hydrogen-cooled generator and separately operably connected to a control center.

There is a need for further equipment for monitoring hydrogen-cooled generators.

SUMMARY OF THE INVENTION

The present invention provides, in a first aspect, a skid for use in a modular system for monitoring a hydrogen-cooled generator. The skid includes a platform, and a support attached to the platform and attachable to a plurality of modules for monitoring the hydrogen-cooled generator.

The present invention provides, in a second aspect, a module connectable to a modular system for monitoring a hydrogen-cooled generator. The module includes a processor for generating data associated with performance of the hydrogen-cooled generator, and at least one of a display for displaying the data and a communications link for transferring the data to a remote location.

The present invention provides, in a third aspect, a modular system for monitoring a hydrogen-cooled generator. The modular system includes a skid having a platform, a support attached to the platform and attachable to a plurality of modules for monitoring the hydrogen-cooled generator, and at least one of a hydrogen gas purity monitoring module, a generator overheat monitoring module, a hydrogen gas dryer module, and a gas/generator monitoring module comprising one of the plurality of modules.

The present invention provides, in a fourth aspect, a modular system for monitoring a hydrogen-cooled generator. The modular system includes a skid having a platform, and a support attached to the platform and attachable to a plurality of modules for monitoring the hydrogen-cooled generator. At least one of a hydrogen gas purity monitoring module, a generator overheat monitoring module, a hydrogen gas dryer module, and a gas/generator monitoring module comprising one of the plurality of modules. One of the hydrogen gas purity monitoring module, the generator overheat monitoring module, the hydrogen gas dryer module, and the gas/generator monitoring module includes a processor for generating data associated with the performance of the hydrogen-cooled generator.

The present invention provides, in a fifth aspect, a modular system for monitoring a hydrogen-cooled generator. The modular system includes a skid having a platform, a hydrogen gas purity monitoring module, a generator overheat monitoring module, a hydrogen gas dryer module, and a gas/generator monitoring module having a processor for generating data associated with performance of the hydrogen-cooled generator. A support attaches to the platform and is attachable to the hydrogen gas purity monitoring module, the generator overheat monitoring module, the hydrogen gas dryer module, and the gas/generator monitoring module. A gas manifold attaches to at least one of the platform and the support, and is attachable to the hydrogen-cooled generator for transferring a supply of hydrogen gas, a supply of CO2 gas, and a supply of air, to the hydrogen-cooled generator.

The present invention provides, in a sixth aspect, a method for use in monitoring a hydrogen-cooled generator. The method includes providing a modular system for at least one of determining gas purity of hydrogen cooling gas in the hydrogen-cooled generator, determining overheating of the hydrogen-cooled generator, and drying of hydrogen cooling gas in the hydrogen-cooled generator.

BRIEF DESCRIPTION OF THE DRAWINGS

The subject matter which is regarded as the invention is particularly pointed out and distinctly claimed in the concluding portion of the specification. The invention, however, may be understood by reference to the following detailed description of the following embodiments and the accompanying drawings in which:

DETAILED DESCRIPTION OF THE INVENTION

Figure 1:
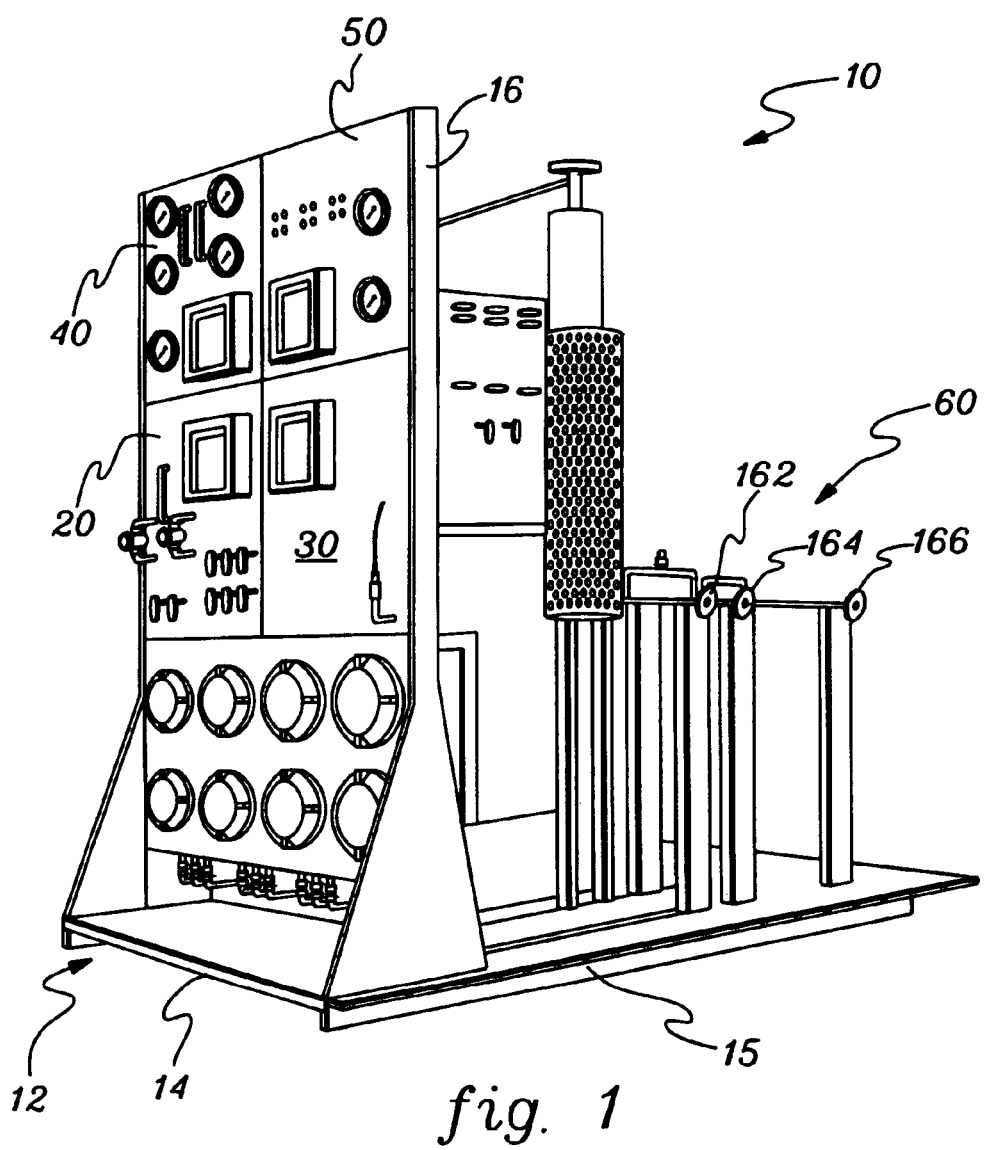
FIG. 1 is a perspective view of a modular system shown in accordance with the present invention.

FIG. 1 illustrates a modular system 10 in accordance with the present invention. In one aspect, modular system 10 is configured as a compact modular system. Modular system 10 may include a readily movable skid 12 having a platform 14 supported on runners 15. Skid 12 also includes an upwardly extending support 16 attached to platform 14 and attachable to a hydrogen gas purity monitoring module 20, a generator overheat monitoring module 30, a hydrogen gas dryer module 40, and a gas/generator monitoring module 50. Attached to skid 12 is also a gas manifold 60 having an air inlet 162, an hydrogen gas inlet 164, and a carbon dioxide (CO2) inlet 166.

Configuring the modular system as a compact modular system may also provide a customizable, cost-efficient approach to monitoring hydrogen-cooled generators. The modular system can be used with both new power plants and retrofit projects. The modular system provides information and data to generator OEMs (Original Equipment Manufacturers) and utilities which can be used to reduce the likelihood of outages and maximize performance. In addition, the engineering and installation costs for installing and connecting the modular system to a hydrogen-cooled generator may be reduced compared to installing and connecting separate stand-alone systems to the hydrogen-cooled generator.

Figure 2:
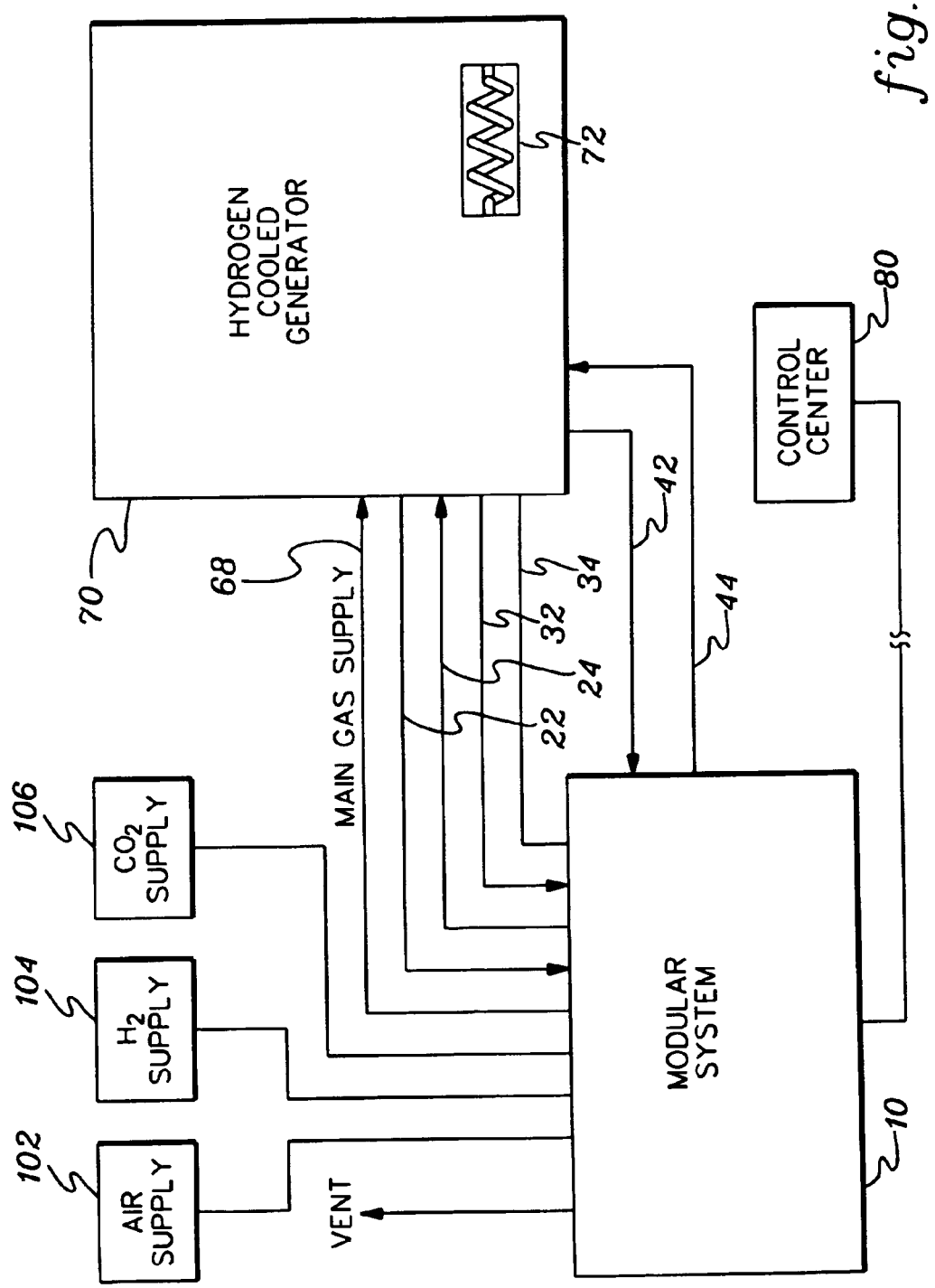
FIG. 2 is a block diagram of the modular system shown in FIG. 1 connected to a hydrogen-cooled generator, a hydrogen supply, a carbon dioxide (CO2) gas supply, an air supply, and a control center.

As shown in FIG. 2, modular system 10 may be operably connected via gas manifold 60 (FIG. 1) to an air supply 102, a hydrogen supply 104, and a CO2 supply 106, a hydrogen-cooled generator 70, and to a control center 80, for example, a computing unit at a remote location. Hydrogen-cooled generator 70 may be an electrical power plant generator which is filled with pressurized hydrogen cooling gas to cool the generator.

The hydrogen cooling gas may be supplied to modular system 10 from hydrogen supply 104, and thereafter, controllably fed by an outlet 68 of gas manifold 60 (FIG. 1) to hydrogen-cooled generator 70. For example, manually operated or automatically controlled valves may operable control the introduction of CO2 to purge air in the hydrogen-cooled generator case and the introduction of hydrogen gas to the hydrogen-cooled generator case. Monitoring of the purity of the supply of hydrogen gas in the hydrogen-cooled generator case may be monitored as described below in connection with hydrogen gas purity monitoring module 20. For repairs, the CO2 may be introduced to purge the hydrogen gas from the hydrogen-cooled generator case. Thereafter, air from air supply 102 may be introduced to the hydrogen-cooled generator case. Typically, during normal operation, the hydrogen cooling gas in the hydrogen-cooled generator case is passed through a heat exchanger 72 to remove heat from the hydrogen cooling gas.

Figure 3:
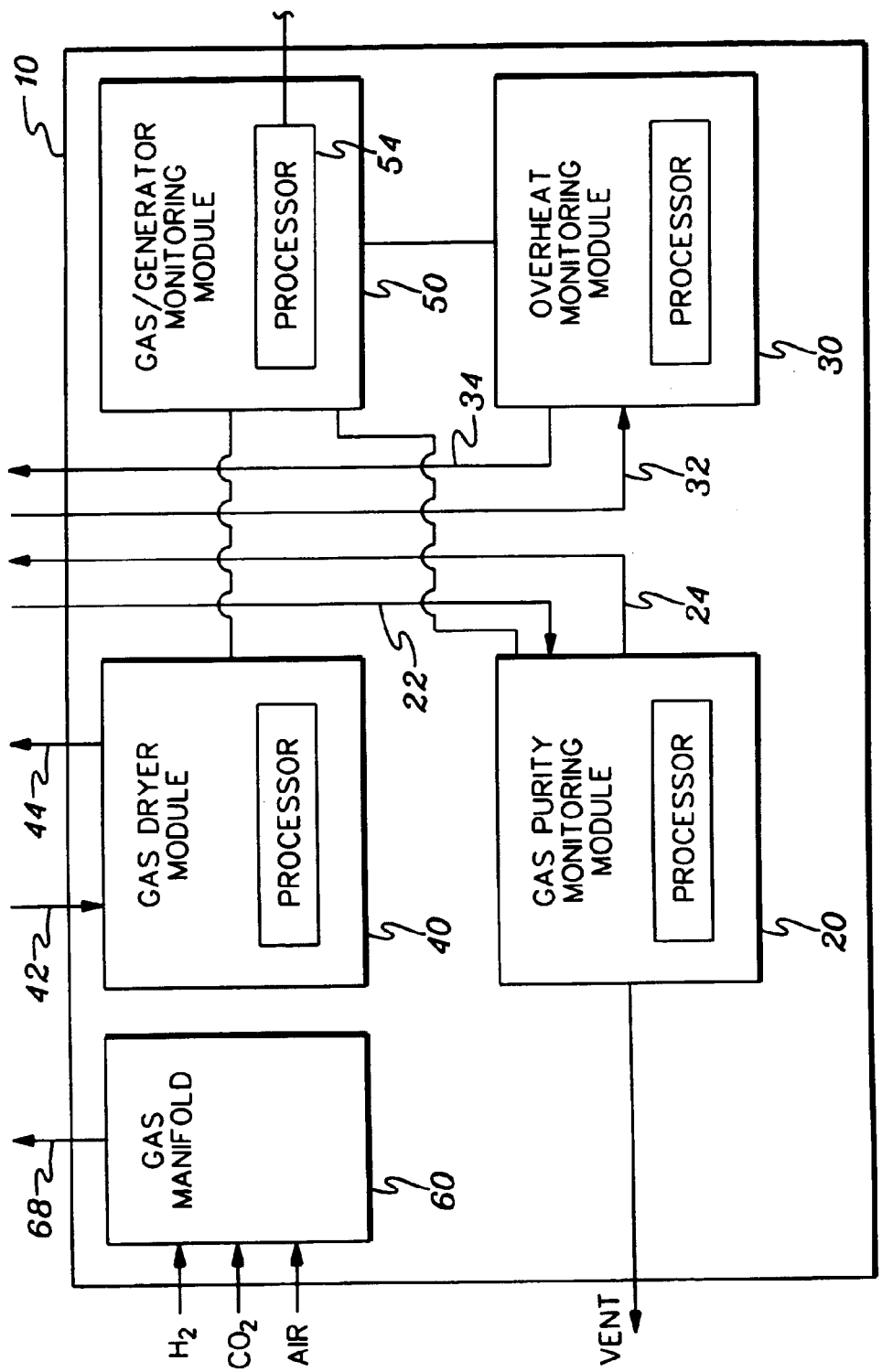
FIG. 3 is a block diagram of the modular system shown in FIG. 1.

With reference to FIGS. 2 and 3, hydrogen gas purity monitoring module 20 analyzes the purity of the hydrogen cooling gas. A portion of the hydrogen cooling gas in hydrogen-cooled generator 70 is supplied via a conduit 22 to hydrogen gas purity monitoring module 20. After testing for the purity of the hydrogen cooling gas, the hydrogen cooling gas is suitably vented or returned via a conduit 24 to the generator. Hydrogen gas purity monitoring module 20 may continuously monitor hydrogen cooling gas during normal and during purge operations to optimize purity levels and operational efficiency. For example, as hydrogen purity drops windage losses increase which results in higher operating costs per megawatt. Since hydrogen can be explosive when mixed with oxygen, maintaining the hydrogen cooling gas at a safe, non-combustible, and non-explosive level also increases safety.

Hydrogen gas purity monitoring module 20 may include suitable sensors/analyzers and controller modules within flame-proof enclosures, a display/control panel, and an optional gas flow indicator with metering valve. The controller modules may include a microcontroller or processor to control purity monitoring, calibration, mode selection, sensor unit control, alarm contacts, fault logging, system inputs/outputs, sensor unit linearization, and diagnostics. Suitable sensors include thermal conductivity sensors which allow monitoring the purity of hydrogen cooling gas during normal operation, allow monitoring the amount of hydrogen gas in CO2 during the initial phase of purging, and allow monitoring the amount of CO2 in air during the final stage of the purge process. Hydrogen gas purity monitoring module 20 may include a display or gages for displaying gas purity.

Early warning of generator overheating can mean the difference between a brief shut-down for minor repairs and a major overhaul involving weeks or even months of costly downtime. High concentrations of submicron particles (pyrolytic products) are produced when materials, e.g., coatings and insulation, within the generator are heated sufficiently to produce thermal decomposition. These "hotspots" can lead to catastrophic failure if not detected in a timely manner.

Generator overheat monitoring module 30 provides a sensitive real-time detector and early warning of generator hotspots. For example, pyrolytic products, when present, may be detected by a suitable sensor such as an ion chamber detector. A portion of the hydrogen cooling gas may be supplied via a conduit 32 to generator overheat monitoring module 30, and after testing for pyrolytic products, the hydrogen cooling gas may be suitably returned via a conduit 34 to the hydrogen-cooled generator.

Generator overheat monitoring module 30 may include a microcontroller or processor so that if an emergency situation occurs, the processor may initiate and monitor an alarm verification sequence upon detection of hotspots. If the alarm is confirmed, a verified alarm indication is given, alarm contacts are switched, and a fixed amount of the hydrogen cooling gas automatically passes through one or more sampling systems, e.g., by activation of a solenoid valve in a filter/solenoid valve assembly. The hydrogen cooling gas then passes through the filter, which removes the submicron particles which are collected for laboratory analysis to determine their source. Alternative sensors may include temperature sensors such as RTDs (resistance temperature detectors) or thermocouples.

A specially synthesized set of chemically and thermally stable compounds applied to critical areas of the generator may also be employed to enhance the information derived by generator overheat monitoring module 30. In the event of a verified alarm, the generator overheat monitoring module may capture a sample of the hydrogen cooling gas so that areas of overheating can be pinpointed. Generator overheat monitoring module 40 may include a display or gages for displaying gas flow and ion chamber detection output Hydrogen gas dryer module 40 removes contaminants from the hydrogen cooling gas during all phases of generator operation. Water, oil and other contaminants often cause corrosion in critical areas of hydrogen-cooled generators and contribute to windage losses and reducing operational efficiency and increasing the likelihood of forced outages.

For example, hydrogen gas dryer module 40 may receive a portion of the hydrogen cooling gas via a conduit 42. Hydrogen gas dryer module 40 may include a suitable dryer system which incorporates a desiccant or drying agent, a catalatic material, or a filter. In addition, hydrogen gas dryer module 40 may also incorporate continuous dew point monitoring and display of the dew point for both inlet and outlet lines to the dryer. The result is that operators can monitor the efficiency of the drying process, and allow dryer regeneration at the optimum time. Other displays or gages may include pressure, temperature, and flow rate. After the hydrogen cooling gas passes through the dryer, the dried hydrogen cooling gas is returned via a conduit 44 to the hydrogen-cooled generator.

Figure 4:
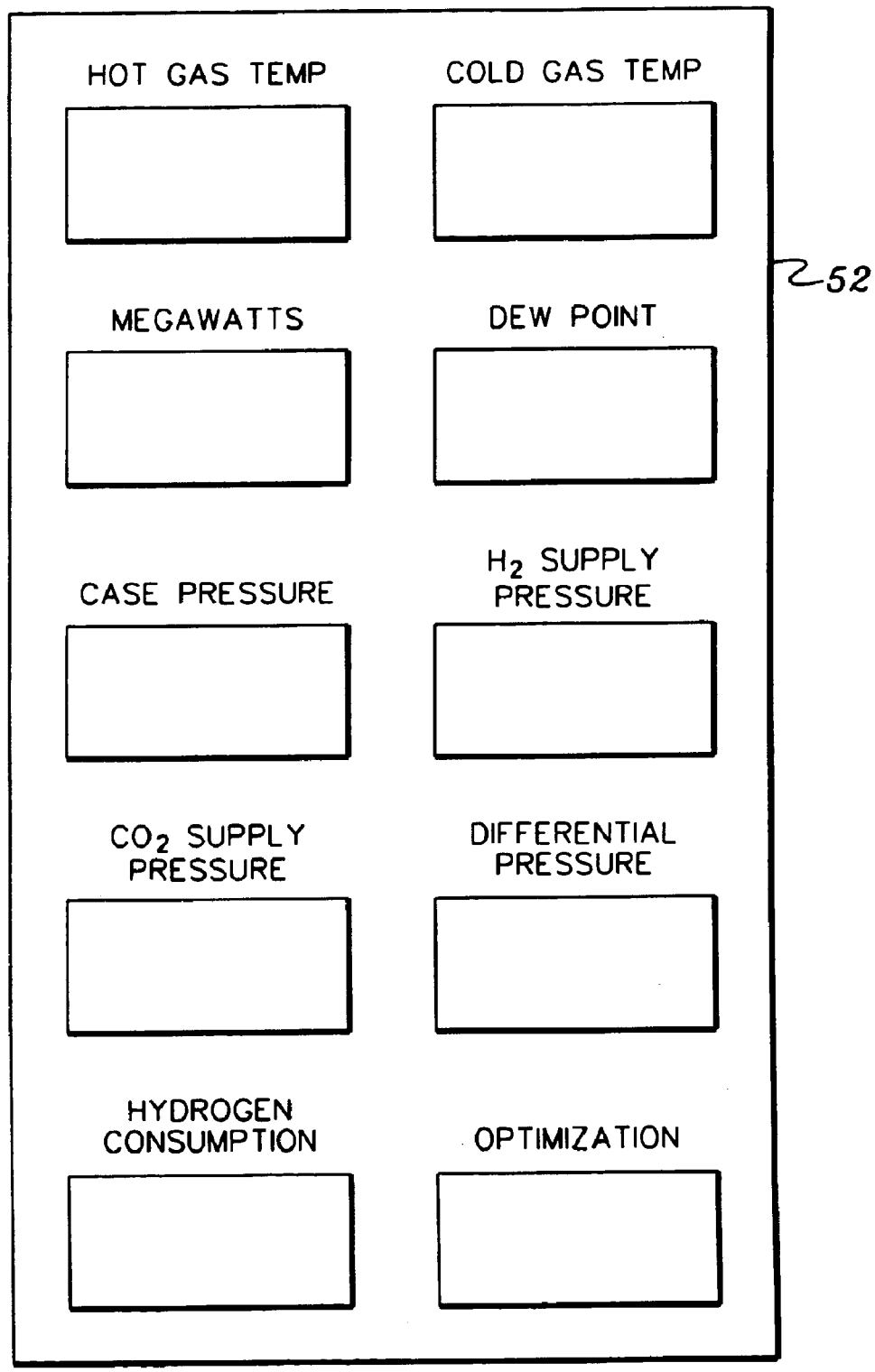
FIG. 4 is an illustration of the display of the gas/generator monitoring module of the modular system shown in FIG. 1.

Gas/generator monitoring module 50 allows monitoring of the operation of the hydrogen-cooled generator and generating of data regarding the performance of the hydrogen-cooled generator. FIG. 4 illustrates a display 52 of gas/generator monitoring module 50 for displaying a hot gas temperature, a cold gas temperature, a megawatts output, a dew point, a case pressure, a hydrogen supply pressure, CO2 supply pressure, a differential pressure, a hydrogen consumption, and an optimization factor. The hot and cold gas temperatures may be obtained by thermal couples or RTDs (resistance temperature detectors) attached to an inlet and an outlet, respectively, of the cooling loop, the megawatts output may be obtained from the control center, the dew point may be obtained from the hydrogen gas dryer, the case pressure may be obtained from a pressure transducer attached to the generator, the hydrogen supply pressure may be obtained from a pressure transducer attached to the hydrogen supply line, the CO2 supply pressure may be obtained from a pressure transducer attached to the CO2 supply line, the differential pressure may be obtained from a differential pressure transducer for measuring pressure across a fan in the hydrogen-cooled generator, and the hydrogen consumption may be obtained from a flow meter disposed between the hydrogen supply and the hydrogen-cooled generator. From the above description, the various items of information may be obtained directly from sensors attached to the hydrogen-cooled generator or may be obtained via a communications link (described more fully hereinafter) from the control center.

In another aspect of the present invention, gas/generator monitoring module 50 enables a power utility or generator OEM to display an optimization factor or data regarding the performance of the hydrogen-cooled generator. For example, an optimization factor may be based on the hydrogen purity, the differential pressure, the case pressure, the megawatts that the generator is producing, the cold gas temperature, the hot gas temperatures, the amount of hydrogen consumed, the detection of overheating, the dew point reading, and/or other measurements.

Figure 5:
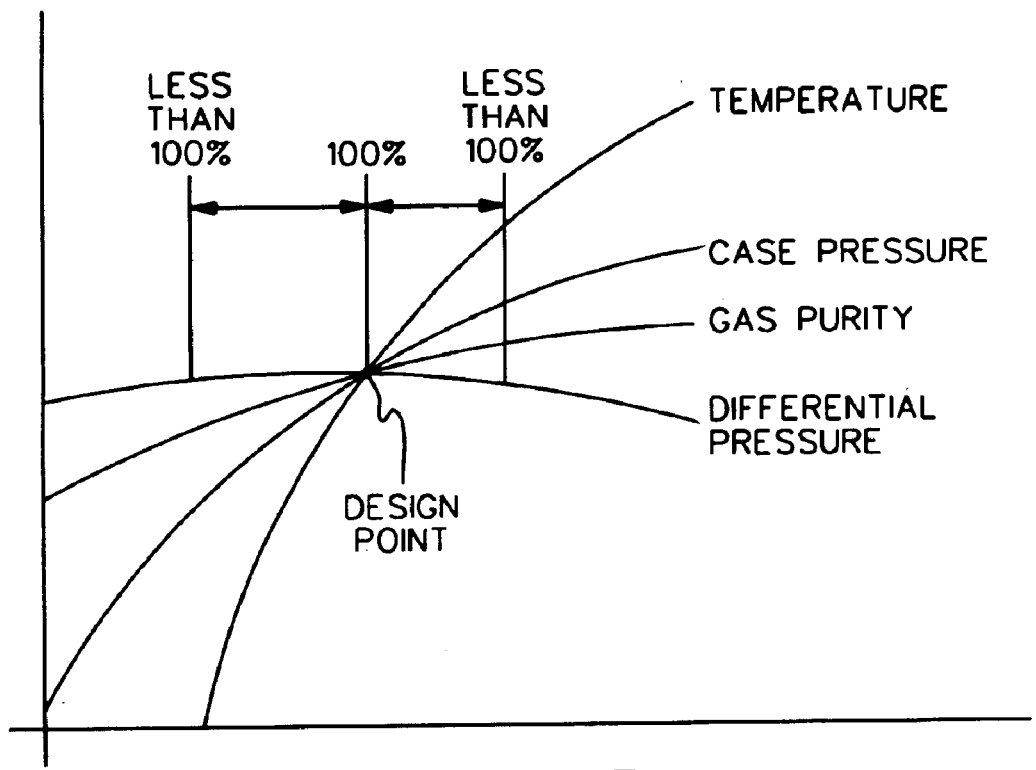
FIG. 5 is a graph illustrating various operating parameters and an optimum design operating point of a hydrogen-cooled generator.

FIG. 5 graphically illustrates the use of various operating parameters of a hydrogen-cooled generator for indicating a design point for efficient operation of the hydrogen-cooled generator. Operating the hydrogen-cooled generator at a point away from the design point results in a less efficient operation of the hydrogen-cooled generator.

Suitable programming or algorithms may be written and run on a suitable processor 54 or microcontroller of the gas/generator monitoring module for calculating an optimization factor based on various variables and weightings which may be specified by the end user or generator manufacturer. The software may also allow reprogramming or adjustment by an end user.

For example, operating away from the design point may result in less that 100-percent efficiency. The optimization factor may be displayed in real-time. For examples, values between 90-percent and 100-percent efficiency may be selected as being acceptable. Alternatively, the display may read, "acceptable" or "not acceptable", or "good", "fair", and "poor." The optimization factor can be displayed locally on the gas/generator monitoring module, and/or transferred via the communications link.

In addition to mechanically and electrically integrating the various modules together, another aspect of the present invention includes the gas/generator monitoring module having a communications link, e.g., a two-wire communication (e.g., a 4-milliamp to 20-milliamp output), an RS232 electrical interface, a modem, a wireless remote communication, a global communications network interface connectable to the Internet, or other suitable communications link, for integrating the modular system with control center 80 or to a remote computing unit. This configuration reduces the number of connections or wires typically required to communicate information from each of the various modules to a control center or a remote computing unit, and/or to receive information from the control center or the remote computing unit. In addition, the remote computing unit may allow third-party monitoring of information and data streams, and preventative maintenance analysis. Also, an operator may adjust the modular system and/or control the hydrogen-cooled generator based on the display readouts including the optimization factor, and/or the control center may use the data from the modular system for controlling the operation of the hydrogen-cooled generator.

From the present description, it will be appreciated that any or each of the various modules may include a processor and may be provided with a communication link for connecting to a remote control unit and/or a display for displaying generated data regarding the performance of the hydrogen-cooled generator. In addition, the processor may be include, for example, a central processing unit (CPU), a memory, and one or more input/output devices, which are well known in the art. It will also be appreciated by those skilled in the art that a utility may choose the various components or modules which are to be assembled into the modular system. In addition, the modular system may include more than one of the same components or modules, and may include more or less than the four modules described above.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A modular system for monitoring a hydrogen-cooled generator, said modular system comprising:
   a skid comprising a platform;
   a support attached to said platform and attachable to a plurality of modules for monitoring the hydrogen-cooled generator; and
   at least one of a hydrogen gas purity monitoring module, a generator overheat monitoring module, a hydrogen gas dryer module, and a gas/generator monitoring module comprising one of said plurality of modules.

2. The modular system of claim 1 wherein said support is attachable to said hydrogen gas purity monitoring module, said generator overheat monitoring module, said hydrogen gas dryer module, and said gas/generator monitoring module.

3. The modular system of claim 1 wherein said at least one of said hydrogen gas purity monitoring module, said generator overheat monitoring module, said hydrogen gas dryer module, and said gas/generator monitoring module comprises said hydrogen gas purity monitoring module, said generator overheat monitoring module, said hydrogen gas dryer module, and said gas/generator monitoring module.

4. The modular system of claim 1 further comprising a gas manifold attached to at least one of said platform and said support and attachable to the hydrogen-cooled generator for transferring a supply of hydrogen gas to the hydrogen-cooled generator.

5. The modular system of claim 1 further comprising a gas manifold attached to at least one of said platform and said support and attachable to the hydrogen-cooled generator for transferring a supply of hydrogen gas, a supply of CO2 gas, and a supply of air, to the hydrogen-cooled generator.

6. The modular system of claim 1 wherein said support is attachable to said hydrogen gas purity monitoring module, said generator overheat monitoring module, said hydrogen gas dryer module, and the gas/generator monitoring module, and further comprising a gas manifold attached to at least one of said platform and said support and attachable to the hydrogen-cooled generator for transferring a supply of hydrogen gas, a supply of CO2 gas, and a supply of air, to the hydrogen-cooled generator.

7. A modular system for monitoring a hydrogen-cooled generator, said modular system comprising:
   a skid comprising a platform;
   a support attached to said platform and attachable to a plurality of modules for monitoring the hydrogen-cooled generator;
   at least one of a hydrogen gas purity monitoring module, a generator overheat monitoring module, a hydrogen gas dryer module, and a gas/generator monitoring module comprising one of said plurality of modules; and
   said at least one of said hydrogen gas purity monitoring module, said generator overheat monitoring module, said hydrogen gas dryer module, and said gas/generator monitoring module comprising a processor for generating data associated with the performance of the hydrogen-cooled generator.

8. The modular system of claim 7 said at least one of said hydrogen gas purity monitoring module, said generator overheat monitoring module, said hydrogen gas dryer module, and said gas/generator monitoring module further comprising at least one of a display for displaying said data and a communications link for transferring said data to a remote location.

9. The modular system of claim 7 wherein said data comprises data generated from information from said at least one of said hydrogen gas purity monitoring module, said generator overheat monitoring module, and said hydrogen gas dryer module.

10. The modular system of claim 7 wherein said data comprises data generated from information from said hydrogen gas purity monitoring module, said generator overheat monitoring module, and said hydrogen gas dryer module.

11. The modular system of claim 7 wherein said data comprises data generated from information from the hydrogen-cooled generator.

12. The modular system of claim 7 wherein said data comprises data generated from information from said hydrogen gas purity monitoring module, said generator overheat monitoring module, said hydrogen gas dryer module, and the hydrogen-cooled generator.

13. The modular system of claim 12 wherein said gas/generator monitoring module is operable for communicating with a remote location.

14. A modular system for monitoring a hydrogen-cooled generator, the modular system comprising:
   a skid comprising a platform;
   a hydrogen gas purity monitoring module;
   a generator overheat monitoring module;
   a hydrogen gas dryer module;
   a gas/generator monitoring module comprising a processor for generating data associated with performance of the hydrogen-cooled generator;
   a support attached to said platform and attachable to said hydrogen gas purity monitoring module, said generator overheat monitoring module, said hydrogen gas dryer module, and said gas/generator monitoring module; and
   a gas manifold attached to at least one of said platform and said support and attachable to the hydrogen-cooled generator for transferring a supply of hydrogen gas, a supply of CO2 gas, and a supply of air, to the hydrogen-cooled generator.

15. The modular system of claim 14 wherein said gas/generator monitoring module is operable for communicating with a remote location.

16. A method for use in monitoring a hydrogen-cooled generator, the method comprising:
   providing a modular system for determining overheating of the hydrogen-cooled generator, and for at least one of determining gas purity of hydrogen gas in the hydrogen-cooled generator and drying of hydrogen gas in the hydrogen-cooled generator.

17. The method of claim 16 further comprising generating data associated with performance of the hydrogen-cooled generator.

18. The method of claim 16 further comprising transferring information associated with at least one of the gas purity of hydrogen gas in the hydrogen-cooled generator and drying of hydrogen gas in the hydrogen-cooled generator to a remote location.

19. A skid for use in a modular system for monitoring a hydrogen-cooled generator, said skid comprising:
   a platform;
   a support attached to said platform and attachable to at least one of a hydrogen gas purity monitoring module, a generator overheat monitoring module, a hydrogen gas dryer module, and a gas/generator monitoring module; and
   a gas manifold attached to at least one of said platform and said support and attachable to the hydrogen-cooled generator for transferring a supply of hydrogen gas to the hydrogen-cooled generator.

20. The skid of claim 19 wherein said support is attachable to the hydrogen gas purity monitoring module, the generator overheat monitoring module, the hydrogen gas dryer module, and the gas/generator monitoring module.

21. The skid of claim 19 wherein said gas manifold is attachable to the hydrogen-cooled generator for transferring a supply of CO2 gas and a supply of air, to the hydrogen-cooled generator.

22. A skid for use in a modular system for monitoring a hydrogen-cooled generator, said skid comprising:
   a platform;
   a support attached to said platform and attachable to a plurality of modules for monitoring the hydrogen-cooled generator; and
   a gas manifold attached to at least one of said platform and said support and attachable to the hydrogen-cooled generator for transferring a supply of hydrogen gas to the hydrogen-cooled generator.

23. The skid of claim 22 wherein said gas manifold is attachable to the hydrogen-cooled generator for transferring a supply of CO2 gas, and a supply of air, to the hydrogen-cooled generator.

24. The skid of claim 22 wherein said support is attachable to a hydrogen gas purity monitoring module, a generator overheat monitoring module, a hydrogen gas dryer module, and a gas/generator monitoring module, and wherein said gas manifold is attachable to the hydrogen-cooled generator for transferring a supply of CO2 gas and a supply of air to the hydrogen-cooled generator.

25. The method of claim 16 further comprising transferring information associated with the gas purity of hydrogen gas in the hydrogen-cooled generator, overheating of the hydrogen-cooled generator, and drying of hydrogen gas in the hydrogen-cooled generator to a remote location.

* * * * *